United States Patent [19]
Heese et al.

[11] Patent Number: 5,516,845
[45] Date of Patent: May 14, 1996

[54] CROSS-LINKING OF POLYMERS

[75] Inventors: Ulrich Heese, Mulligen; Renato Salvel, Zurich, both of Switzerland

[73] Assignee: Brugg Kabel AG, Switzerland

[21] Appl. No.: 349,791

[22] Filed: Dec. 6, 1994

[51] Int. Cl.$^6$ .............................. C08J 3/24; C08L 23/16
[52] U.S. Cl. .................... 525/193; 525/194; 525/197; 525/98; 525/304; 525/305; 525/387; 525/331.7; 525/333.8; 524/528; 522/106; 522/109
[58] Field of Search .................................. 525/194, 387, 525/331.7, 333.8, 304, 305, 193, 197, 98

[56] References Cited

U.S. PATENT DOCUMENTS

| | | |
|---|---|---|
| 3,256,366 | 6/1966 | Corbelli . |
| 3,258,447 | 6/1966 | Matteucci et al. . |
| 3,701,702 | 10/1972 | Shichman et al. . |
| 3,806,558 | 4/1974 | Fischer . |
| 4,247,498 | 1/1981 | Castro . |
| 4,342,844 | 8/1982 | Torenbeek et al. . |
| 4,368,280 | 1/1983 | Yui et al. . |
| 4,612,155 | 9/1986 | Wong et al. . |
| 4,678,834 | 7/1987 | Boivin et al. . |
| 4,737,547 | 4/1988 | White . |

FOREIGN PATENT DOCUMENTS 0459208 12/1991 European Pat. Off. .
2213202 12/1973 Germany .

OTHER PUBLICATIONS

Spenadel—Radiation Crosslinking of Polymer Blends—Radiat. Phys. Chem vol. 14, pp. 683–697.

*Primary Examiner*—Carman J. Seccuro, Jr.
*Attorney, Agent, or Firm*—Bachman & LaPointe

[57] ABSTRACT

A thermoplastic basic polymers in pourable form are mixed with similarly pourable carrier polymers dispersable or soluble in the basic polymers with a cross-linking agent to produce cross-linked polymer moldings. These mutually compatible components are heated under further mixing to a reaction temperature above the melting range of the basic polymer and processed. The reaction of free radicals leads to bonds between polymer chains and/or the degradation of polymer chains.

Porous carrier polymers which contain at least one organic peroxide and/or coagent incorporated in the fine pore structure as a fluid silane-free cross-linking agent are mixed in the basic polymer. Peroxide-containing carrier polymers are heated, coagent-containing carrier polymers are irradiated.

The moldings are used for example for cable and sheath isolation, pipes for hot water lines and highly stressed injection moldings.

20 Claims, No Drawings

CROSS-LINKING OF POLYMERS

BACKGROUND OF THE INVENTION

The invention relates to a process for production of cross-linked polymer moldings of thermoplastic base polymers in pourable form which are mixed with pourable carrier polymers dispersable or soluble in the basic polymer with a cross-linking agent, these mutually compatible components are heated under further mixing to a reaction temperature above the melting range of the basic polymer where the reaction of free radicals creates bonds between polymer chains and/or breaks down polymer chains.

Polymers consist of molecular chains with numerous components which repeat each other practically endlessly, which differ from low molecular compounds in relation to physical properties, for example in relation to their high tensile strength and elasticity. As a result of cross-linking of polymer chains, many material properties are changed. Active substances are produced which are superior to the original materials in essential features. Almost all natural and synthetic thermoplastics can be cross-linked. The term thermoplastics or thermoplastic polymers here and below also includes elastomers, in particular thermoplastic elastomers.

Free radicals have one or more unpaired electrons, for example the methyl radical H3C* or the triphenylmethyl radical (C6H5)3C* which has been known for some time. Radical reactions are chain reactions which are instigated by small quantities of reactive free radicals and maintained as chain reactions. Organic free radicals are usually produced by heating compounds with weak covalent bonds. Thus organic peroxides which can easily be split homolytically at the weak O—O bond are initiators for radical reactions. Numerous organic molecules can be split by visible or ultraviolet light, under formation of free radicals. Often a more energy-rich radiation is used, for example β radiation also known as electron radiation, or γ radiation.

In contrast to polymerization, cross-linking is more stoichiometric and leads to a cross-linking yield.

The free radicals formed with a cross-linking agent or by radiation can extract a hydrogen atom from the polymer and become saturated with this. Thus a polymer radical is produced with an unpaired electron. Two of these polymer radicals can link together forming a new C—C bond. Multiple repeats of this reaction create a three-dimensional network from the originally linear polymer chains.

The structure of the basic polymers has an effect on the cross-linking. In addition to the coupling reaction specified above, polymer chains can also be split. In other words, several polymers under the effect of radicals do not link with other chains but are broken down and thus cross-linked. This applies in particular to heavily branched components with many tertiary bonded C-atoms in the main chain. For example, polypropylene (PP), polybutylene (PB), and polyvinylchloride (PVC) are not cross-linked but are broken down. This breaking down, also called degradation, is covered by the present invention with the term cross-linked or cross-linking.

The production of cross-linked polymers using silanes, as is described for example in EP,A2 0426073, is not included in the task of the present invention. According to EP,A2 0426073, a cross-linkable polymer is exposed to moisture in a targeted manner in the presence of a hydrolysis condensation catalyst. The process comprises the mixing of a thermoplastic basic polymer with an essentially water-free solid carrier polymer which contains a silane and a cross-linking agent generating free radicals. This mixture is heated to a temperature above the melting point of the basic polymer and mixed further.

U.S. Pat. No. 4,247,498 describes microporous carrier polymers and a process for their production. The microporous carrier material can absorb relatively large quantities of "functionally useful fluids" and remain a solid body in nature. The microporous products are produced from synthetic thermoplastic polymers and fluids compatible with these. During the production process, some of the compatible fluids are removed again. The compatible fluids may also be the functionally useful fluids mentioned above if these allow direct use. U.S. Pat. No. 4,247,498 does not mention any such cross-linking agents introduced into the pores for polymers.

U.S. Pat. No. 4,783,511 describes a process for the production of cast objects of dry thermoplastic polyamides which have improved mechanical properties and greater dimensional stability than the original polyamide materials. The process includes the addition of dry polyamide "master batch", which comprises a silane and a substrate, for example a polyolefin, a swelling material or a non-swelling thermoplastic sponge. Three processes for the production of a "master batch" are described.

SUMMARY OF THE INVENTION

The present invention includes a process for the production of cross-linked polymer moldings of thermoplastic basic polymers in pourable form. The polymers are mixed with equally pourable carrier polymers dispersable in the basic polymers. The basic and carrier polymers are mutually compatible components which are heated under further mixing to a temperature above the melting range of the basic polymer. The carrier polymer has a porous structure and includes at least one organic peroxide and/or coagent incorporated in the fine pore structure wherein the organic peroxide and/or coagent is a fluid, silane-free, cross-linking agent which is mixed into the basic polymers. The mixture is performed in a closed system under a pressure of at least approximately 3 bar and under the exclusion of air.

DETAILED DESCRIPTION OF THE PREFERRED EMBODIMENT

The task of the inventors was to create a process of the type described above with which cross-linked polymers of high quality can be produced simply and cheaply without the use of silanes.

The task is solved by the invention in that the porous carrier polymers, which each have at least one organic peroxide and/or coagent introduced into the fine pore structure as a fluid silane-free cross-linking agent, are mixed into the basic polymers. Special and further design forms of the invention are the subject of dependent patent claims.

The homolytic splitting of the O—O bond of organic peroxides is always initiated by heat. The rate of decomposition is decisive for the complete reaction. The half-lives of the peroxide used can therefore be considered as a basis for the necessary cross-linking time. After approximately ten half-lives at the latest, the maximum possible utilization has been achieved as the peroxide has decomposed practically completely.

Organic peroxides are available as fluids or in powder form, where the latter are melted or dissolved to charge the fine porous carrier polymers and incorporated into the cavities. Highly reactive peroxides are diluted with stabilizing agents for safety reasons which facilitates the incorporation into the pores.

As stated above, raising the temperature accelerates the peroxide degradation, by a rule of thumb approximately two to three times per 10° C. The optimum reaction temperature is application-specific according to the polymer type and peroxide type, and in practice is at least approximately 120° C., preferably in the range of 150 to 250° C.

The peroxide level, also determined application-specific, mainly affects the degree of cross-linking and to a lesser extent the speed of cross-linking. Optimum degrees of cross-linking have been achieved with an added quantity of peroxide in the range of 0.5 to 10 w. % in relation to the polymer, depending on the peroxide type, the form and composition of the reaction mixture.

Mixtures with peroxide-containing carrier polymers are preferably heated to at least 120° C., in particular 180 to 280° C., to generate free radicals.

The mixtures of the thermoplastic basic polymers and peroxide-containing carrier polymers are preferably heated in a closed system. According to the nature of the peroxide, this process is carried out at least under exclusion of air, suitably with the addition of an inert gas and/or an oxygen inhibitor. In this closed system, the mixtures preferably stand under a pressure of at least approx. 3 bar, preferably at least approx. 10 bar. This pressure is sufficiently high to keep the resulting gases in solution.

The chemical structure of the basic polymers is of essential significance for the suitability of an organic peroxide as a cross-linking agent. This specifies in particular the nature of the fractions on degradation into radicals and the ability of the peroxide to split hydrogen atoms from the polymer chains. The fluid or soluble peroxides listed below have proved particularly advantageous:
Tert.butylcumylperoxide (BCPU); 2,5-dimethyl-2,5di(tert.butylperoxy) hexane (DHBP); di(tert.butyl) peroxide (DTBP); 2,5-dimethyl-2,5-di(tert.butylperoxy) hexine (DYBP); dicumylperoxide (DCUP).

These peroxides listed as examples may be used both individually and as mixtures.

During the mixing process, the mass temperature must not rise too far otherwise an undesirable pre-cross-linking can occur above the scorch temperature. This is preferably avoided by corresponding cooling of the reaction device.

The degree of cross-linking can be improved if coagents are added to the reaction mixture which intervene in the cross-linking process and thus increase the number of linking points between the polymer chains or the degree of degradation. It is however observed that with the addition of coagents, the peroxide requirement is lowered but on the other hand an undesirable pre-cross-linking can be stimulated.

In a variant according to the invention, coagents can be added without peroxides. In this case, there is no need to raise the temperature but radiation is required so that the coagents form free radicals which cross-link or degrade the polymer chains. Mixtures of coagent-containing carrier polymers can be irradiated with visible or ultraviolet light and split at the weaker bonds, and at stronger bonds the energy richer β or γ radiation is preferably used. β radiation is also known as electron radiation. The further reaction stages of the free radicals largely correspond to the peroxide-induced reactions. With an electron radiation cross-linking of polymers by coagents, the flow behaviour of the plastic melt can be favorably influenced, for example with the use of trimethylpropane trimethacrylate (TRIM).

Coagents mixed into the pores of the carrier polymers in the basic polymers are preferably methacrylate, acrylate and/or allyl compounds. In particular, carrier polymers with ethyleneglycol dimethacrylate (EDMA), trimethylopropane trimethacrylate (TRIM/TMPT), butylene glycodimethacrylate (BDMA), trimethylopropane triacrylate (TMPTA), triallylcyanurate (TAC), triallylisocyanurate (TAIC), triallylphosphate (TAP), triallyltrimellitate (TATM) and/or diallylphthalate (DAP) have proved advantageous.

The radical-forming peroxides and/or coagents are suitably charged onto the carrier at a concentration of 5 to 80 w. %, preferably 10 to 60 w. % and mixed in a concentration of 0.05 to 5 w. %, in particular 0.1 to 3 w. % in relation to the basic polymer. These values are relatively widespread even for the same degree of cross-linking and essentially depend on the substance.

The basic polymers used which are cross-linked according to the invention comprise for example the following four groups:

a homopolymer consisting of an α-olefin with 2–8 carbon atoms or a copolymerisate of two corresponding α-olefins, preferably copolymerisates of ethylene, also a homopolymerisate of low (LDPE), linear low (LLDPE), very low (VLDPE), ultra low (ULDPE) or high density (HDPE), propylene, also homopolymerisate 1-butylene, 1-pentylene, 1-hexylene, 1-octylene, isobutylene, 2-methyl-1-butylene, 3-methyl-1-pentylene, 4-methyl-1-pentylene, 2,3 dimethyl-1-butylene, 2-ethyl-1-butylene, and mixtures thereof, a copolymerisate of ethylene with 1-butylene, 1-hexylene, 1-octylene or 4-methyl-1-pentylene.

an ethylenevinylacetate copolymerisate, an ethylenethylacetate copolymerisate, an ethyleneacrylic acid copolymerisate and mixtures thereof or with copolymers of ethylene and 1-butylene, 1-hexylene, 1-octylene or 4-methyl-1-pentylene.

ethylenepropylene rubber (EPDM), also diene modified (EP), a styrene butadiene styrene copolymerisate (SBS), a styrene ethylene butylene styrene copolymerisate (SEBS) and mixtures thereof.

In practice, basic polymers are available as granulates or pellets, are easily pourable and therefore ideal for mixing with compatible carrier polymers.

The charged carrier polymers mixed into the basic polymers have a fine porous structure which is preferably open-pore at least in part. These carrier polymers are described for examples in U.S. Pat. No. 4,247,498 with regard to production and physical properties. The carrier polymers must be compatible with the basic polymers and preferably consist of the same substance. In industrial practice, these are for example polyethylene with high (HDPE), low (LDPE) or linear low (LLDPE) density, ethylvinylacetate copolymerisate (EVA) and mixtures thereof. Like the basic polymers, the carrier polymers are also preferably pourable granules or pellets.

The carrier polymers are preferably mixed into the basic polymer in a proportion of 0.1 to 25 w. %, in particular 1 to 10 w. % in relation to the mixture.

In industrial practice, in addition to peroxides and/or coagents, the fine porous carrier polymers contain additional components such as stabilizers, slip additives and/or processing aids. Stabilizers are for example antioxidants, light protection agents and/or heat protection agents, slip additives and processing aids are for examples acid amides, fatty acid esters, fatty alcohols, metal soaps, silicon derivatives and/or fluorine compounds. Other additives may be color pigments or inorganic fillers.

The devices for performance of the process according to the invention are known. The components are incorporated successively into the basic polymer in a mixer extruder, a roller frame, a spiral kneader, and internal mixer or an agitator. Further processing is also known, e.g. pouring, injection molding, drawing, pressing, sintering, calendering and/or pelletizing.

With the process according to the invention, the tension modulus, the elasticity, the remaining compression deformation, the permanent elongation, the resistance to stress crack corrosion, aging, heat, cold, organic solvents can be improved by varying the parameters. It should be noted that the optimum properties are often only achieved at maximum cross-linking. The most favorable settings of all parameters for the required combination of properties must therefore be determined in individual cases most carefully with expert knowledge and skill.

The industrial use of the cross-linked polymer produced in the process according to the invention, including the elastomers as stated, is for example cable and sheath insulation, pipes for hot water lines and highly stressed injection moldings.

We claim:

1. A process for the production of cross-linked polymer molding of a thermoplastic basic polymer in pourable form, comprising the steps of:

mixing said basic polymer with an equally pourable carrier polymer dispersable or soluble in the basic polymer in a closed system under a pressure of at least approximately 3 bar an under the exclusion of air and forming a mixture, wherein the basic and carrier polymers are mutually compatible; and heating said mutually compatible basic and carrier polymers under further mixing to a temperature above the melting range of the basic polymer;

wherein said carrier polymer has a fine porous structure and an organic peroxide incorporated in the fine porous structure, and wherein the organic peroxide is a fluid silane-free, cross-linking agent.

2. The process according to claim 1, wherein during said step of heating, the mixture is heated in a closed system with at least one of an inert gas and with an oxygen inhibitor.

3. The process according to claim 2, wherein during the step of heating, the mixture is heated under a pressure of at least approximately 10 bar.

4. The process according to claim 1, wherein the carrier polymer consists of the same substance as the basic polymer.

5. The process according to claim 1, wherein during the step of mixing, the carrier polymer is added to the basic polymer in a proportion of 0.1 to 25 W. %.

6. The process according to claim 5, wherein during the step of mixing, the carrier polymer is added to the basic polymer in a proportion of 1 to 10 wt. %

7. The process according to claim 1, wherein said organic peroxide is charged onto the carrier polymer with a concentration of 5 to 80 wt. % and mixed in a concentration of 0.05 to 5 wt. % in relation to the basic polymer.

8. The process according to claim 7, wherein organic peroxide is charged onto the carrier with a concentration of 10 to 60 wt. % and mixed in a concentration of 0.1 to 3 wt. % in relation to the basic polymer.

9. The process according to claim 1, wherein the basic polymer is selected from the group consisting of homopolymers, copolymers, and terpolymers.

10. The process according to claim 9, wherein:

said homopolymer is selected from the group consisting of homopolymers of $\alpha$-olefin with 2–8 carbon atoms and mixtures thereof;

said copolymer is selected from the group consisting of ethylene with at least one of 1-butylene, 1-hexylene, 1-octylene and 4-methyl-1-pentylene, ethylenevinylacetate, ethyleneethylacetate, ethyleneacrylic acid, ethyoenepropylene rubber and mixtures thereof; and said terpolymer is selected from the group consisting of ethylenepropylene rubber (EPDM), styrene butadiene styrene (SBS), styrene ethylene butylene styrene (SEBS), and mixtures thereof.

11. The process according to claim 1, wherein the carrier polymer mixed into said basic polymer is charged with at least one of a stabilizers and slip additives and processing aid.

12. The process according to claim 1, wherein the mixture of said basic polymer and said peroxide containing carrier polymer is heated to a temperature of at least approximately 120° C. to generate free radicals.

13. The process according to claim 12, wherein the mixture of said basic polymer and said peroxide containing carrier polymer is heated to a temperature range of 180°–280° C. to generate free radicals.

14. The process according to claim 12, wherein said organic peroxide is in the form of one of fluid and fluidizable, having a melting point below the decomposition point and is a further mixed with a stabilizing agent.

15. The process for the production of cross-linked polymer moldings of thermoplastic basic polymer in pourable form, comprising the steps of:

mixing said basic polymer with equally pourable carrier polymer dispersable or soluble in the basic polymer in a closed system under a pressure of at least approximately 3 bar and under the exclusion of air and forming a mixture, wherein the basic and carrier polymers are mutually compatible; and heating said mutually compatible basic and carrier polymers under further mixing to a temperature above the melting range of the basic polymer;

wherein said carrier polymer has a fine porous structure and at least one organic coagent incorporated in the fine porous structure, and wherein the organic coagent is a silane-free, cross-linking fluid agent.

16. The process according to claim 15, further comprising the step of irradiating said mixture with at least one of visible light, ultraviolet light, $\beta$, and $\gamma$-rays to generate free radicals.

17. The process according to claim 11, wherein said stabilizer is selected from the group consisting of antioxidants, light protection agents, and heat protection agents and wherein said slip additives and processing aid is selected from the group consisting of acid amides, fatty acid esters, fatty alcohols, metal soaps, silicon derivatives and fluorine compounds.

18. The process according to claim 14, wherein said organic peroxide is selected from the group consisting of tert.butyl-cumyl-peroxide (BCUP), 2,5-dimethyl-2,5-di(tert.butylperoxy) hexane (DHBP), di(tert.butyl) peroxide (DTBP), 2,5-dimethyl-2,5 di(tert-butylperoxy) hexine (DYBP), and dicumylperoxide (DCUP), and mixtures thereof.

19. The process according to claim 15, wherein said coagent is at least one of an acryl compound and an allyl compound.

20. The process according to claim 19, wherein said acryl compound is selected from the group consisting of ethyleneglycol dimethacrylate (EDMA), trimethylopropane trimethacrylate (TRIM/TMPT), butyleneglycoldimethacrylute (BDMA), and trimethylopropane triacrylate (TMPTA) and said allyl compound is selected from the group consisting of triallylcyanurate (TAC), triallylisocyanurate (TAIC), triallylphosphate (TAP), triallyltrimellitate (TATM), and diallylphthalate (DAP).

* * * * *